(12) United States Patent
Fukuoka

(10) Patent No.: US 9,898,696 B2
(45) Date of Patent: Feb. 20, 2018

(54) IC CARD ISSUANCE APPARATUS, IC CARD ISSUANCE SYSTEM AND IC CARD ISSUANCE METHOD

(71) Applicant: Kabushiki Kaisha Toshiba, Minato-ku (JP)

(72) Inventor: Hiroki Fukuoka, Tokyo (JP)

(73) Assignee: Kabushiki Kaisha Toshiba, Minatu-ku (JP)

(*) Notice: Subject to any disclaimer, the term of this patent is extended or adjusted under 35 U.S.C. 154(b) by 0 days.

(21) Appl. No.: 15/263,702

(22) Filed: Sep. 13, 2016

(65) Prior Publication Data

US 2017/0091609 A1 Mar. 30, 2017

(30) Foreign Application Priority Data

Sep. 29, 2015 (JP) ................................ 2015-191916

(51) Int. Cl.
| | | |
|---|---|---|
| G06K 19/00 | (2006.01) | |
| G06K 19/077 | (2006.01) | |
| G06K 19/04 | (2006.01) | |
| G06K 19/06 | (2006.01) | |
| G06Q 20/34 | (2012.01) | |

(52) U.S. Cl.
CPC ..... *G06K 19/07716* (2013.01); *G06K 19/044* (2013.01); *G06K 19/06187* (2013.01); *G06Q 20/341* (2013.01); *G06Q 20/355* (2013.01); *G06Q 20/3552* (2013.01); *G06Q 20/3555* (2013.01)

(58) Field of Classification Search
USPC .......................... 235/487, 492; 340/10, 572
See application file for complete search history.

(56) References Cited

U.S. PATENT DOCUMENTS

2002/0134832 A1 9/2002 Nishimura
2003/0222137 A1* 12/2003 Nishimura ........... G06Q 20/341
235/380

FOREIGN PATENT DOCUMENTS

| EP | 1 260 944 A2 | 11/2002 |
| JP | 5-274242 | 10/1993 |
| JP | 2006-31286 A | 2/2006 |

OTHER PUBLICATIONS

Office Action dated May 23, 2017 in Singaporean Patent Application No. 10201607533U.

* cited by examiner

*Primary Examiner* — Matthew Mikels
(74) *Attorney, Agent, or Firm* — Oblon, McClelland, Maier & Neustadt, L.L.P.

(57) ABSTRACT

An IC card issuance apparatus includes an issuance processing unit and a data supply unit. The issuance processing unit performs processing for issuing an IC card based on issuance data. The data supply unit monitors whether or not an issuance data file containing the issuance data is stored in a storage apparatus designated in advance, and supplies the issuance data contained in the issuance data file stored in the storage apparatus to the issuance processing unit such that the issuance processing unit executes issuance of the IC card based on the issuance data if the issuance data file is stored in the storage apparatus.

1 Claim, 6 Drawing Sheets

IC CARD ISSUANCE APPARATUS, IC CARD ISSUANCE SYSTEM AND IC CARD ISSUANCE METHOD

CROSS-REFERENCE TO RELATED APPLICATION

This application is based upon and claims the benefit of priority from Japanese Patent Application No. 2015-191916, filed Sep. 29, 2015, the entire contents of which are incorporated herein by reference.

FIELD

Embodiments of the present invention relate to an IC card issuance apparatus, an IC card issuance system, and an IC card issuance method.

BACKGROUND

In recent years, IC card issuance apparatuses have come to be known that issue an IC card by storing issuance data in the IC card. The issuance data that is stored in the IC card is generated, for example, by integrating individual data different for each card such as personal information and data for a conventional magnetic card, common data required by the application executed on the IC card OS (operating system), and format data different for each IC card product. This issuance data is generated by an issuance data generation application or the like that is executed in an apparatus other than the IC card issuance apparatus.

DETAILED DESCRIPTION

An IC card issuance apparatus of embodiments includes an issuance processing unit and a data supply unit. The issuance processing unit performs processing for issuing an IC card based on issuance data. The data supply unit monitors whether or not an issuance data file containing the issuance data is stored in a storage apparatus designated in advance, and supplies the issuance processing unit, the issuance data contained in the issuance data file stored in the storage apparatus to the issuance processing unit such that the issuance processing unit executes issuance of the IC card based on the issuance data if the issuance data file is stored in the storage apparatus.

An IC card issuance apparatus, an IC card issuance system and an IC card issuance method of embodiments will be described below with reference to the drawings.

First Embodiment

Figure 1:
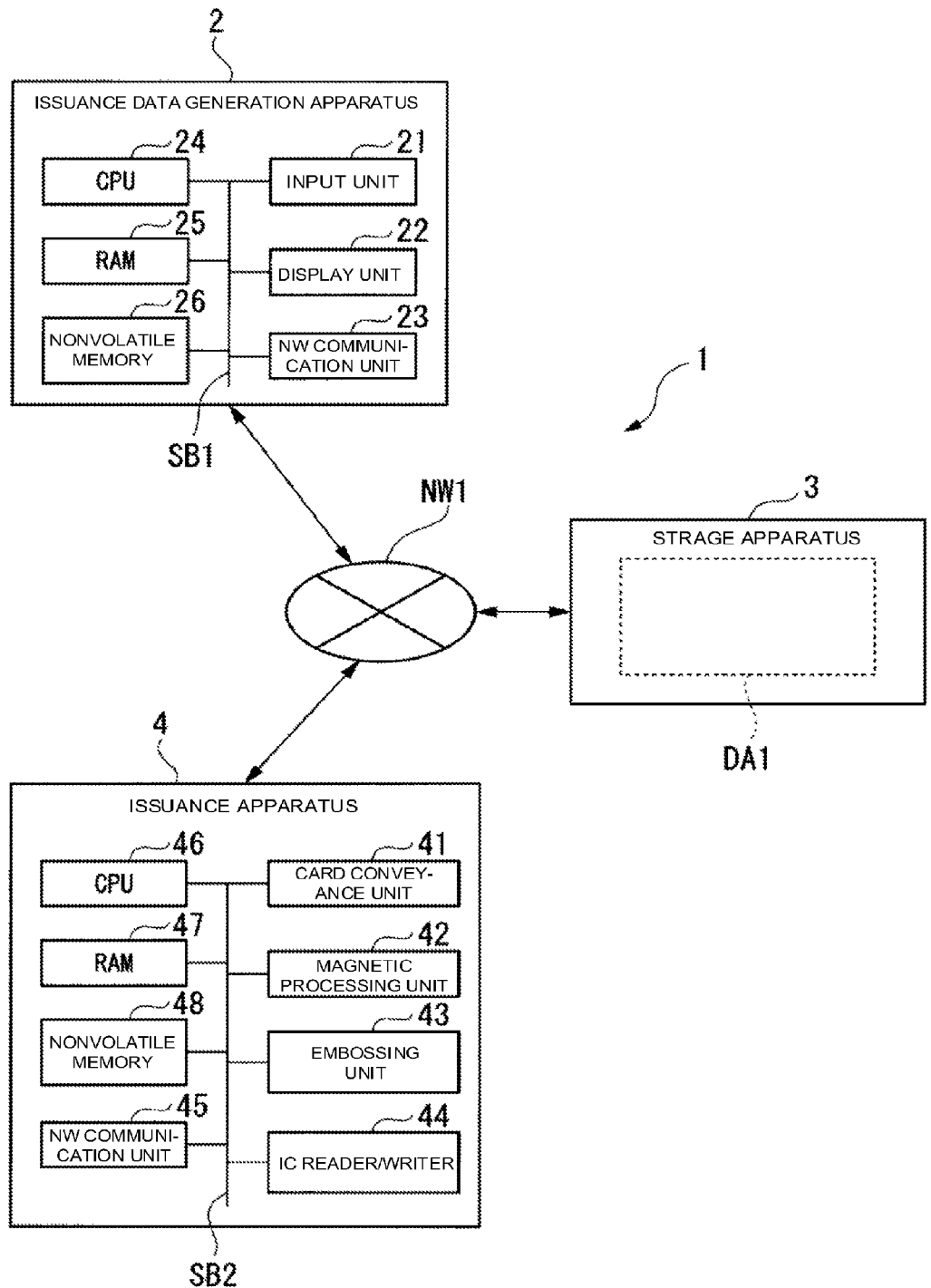
FIG. 1 is a diagram showing an example of a hardware configuration of an IC card issuance system of a first embodiment.

FIG. 1 is a diagram showing an example of a hardware configuration of an IC card issuance system 1 of a first embodiment.

As shown in FIG. 1, the IC card issuance system 1 is provided with an issuance data generation apparatus 2, a storage apparatus 3 and an issuance apparatus 4. Note that the issuance data generation apparatus 2, the storage apparatus 3 and the issuance apparatus 4 are connected to each other via a network NW1.

The issuance data generation apparatus 2 generates issuance data required for issuance processing for bringing an IC card 5 (see FIG. 2) into an operable state. Note that the issuance data will be described later in detail. The issuance data generation apparatus 2 is a computer apparatus for performing data processing by executing a program, for example, a terminal apparatus such as a PC (personal computer). The issuance data generation apparatus 2 generates issuance data for issuing the IC card 5 based on supplied data, and stores the generated issuance data in an entry area DA1 of the storage apparatus 3, which is designated in advance and will be described later.

The issuance data generation apparatus 2 is provided with an input unit 21, a display unit 22, an NW (network) communication unit 23, a CPU (Central Processing Unit) 24, a RAM (Random Access Memory) 25 and a nonvolatile memory 26. The input unit 21, the display unit 22, the NW communication unit 23, the CPU 24, the RAM 25 and the nonvolatile memory 26 are connected to each other using a system bus SB1, for example.

The input unit 21 is an input device such as a keyboard and a mouse, and accepts various types of information in accordance with an operator's operation.

The display unit 22 is a liquid crystal display or the like, and displays various types of information.

The NW communication unit 23 is a communication interface connected to the network NW1, and communicates, for example, with the storage apparatus 3 via the network NW1.

Note that the network NW1 is constructed as a LAN (Local Area Network), for example.

The CPU 24 executes a program stored in the RAM 25 or the nonvolatile memory 26, and performs various types of processing of the issuance data generation apparatus 2.

The RAM 25 is a volatile memory such as a DRAM (Dynamic RAM), and temporarily stores data used when various types of processing of the issuance data generation apparatus 2 are performed. The RAM 25 also temporarily stores a program that is executed by the CPU 24.

The nonvolatile memory 26 is an HDD (Hard Disk Drive), an SSD (Solid State Drive) or the like, and stores various programs and various types of data.

The storage apparatus 3 is an HDD, an SSD, a data server (file server) or the like that can be connected to the network NW1, and is configured to be accessible from the issuance data generation apparatus 2 and the issuance apparatus 4 via the network NW1. The storage apparatus 3 has a predetermined area (for example, the entry area DA1) for using issuance data as input of the issuance apparatus 4, the area having been designated in advance. The issuance data generation apparatus 2 stores issuance data in the entry area DA1 of the storage apparatus 3. Also, the issuance data stored in the entry area DA1 of the storage apparatus 3 is read out and further deleted by the issuance apparatus 4.

The issuance apparatus 4 (an example of an IC card issuance apparatus) issues the IC card 5 based on the issuance data. The issuance apparatus 4 is provided with a card conveyance unit 41, a magnetic processing unit 42, an embossing unit 43, an IC reader/writer 44, an NW communication unit 45, a CPU 46, a RAM 47 and a nonvolatile memory 48. The card conveyance unit 41, the magnetic processing unit 42, the embossing unit 43, the IC reader/writer 44, the NW communication unit 45, the CPU 46, the RAM 47 and the nonvolatile memory 48 are connected to each other using a system bus SB2, for example.

When the IC card 5 being issued, the card conveyance unit 41 takes out the IC card 5 from a rack for unissued cards (not illustrated) that stores the IC cards 5 that have not been issued, and after conveying the IC card 5 to constituent elements, namely, the magnetic processing unit 42, the embossing unit 43 and the IC reader/writer 44, conveys the IC card 5 to a rack for issued cards (not illustrated) that stores the IC cards 5 that have been issued.

The magnetic processing unit 42 executes magnetic processing for storing magnetic card data, which is data for a magnetic card, in a magnetic stripe MS1 (see FIG. 2) of the IC card 5.

The embossing unit 43 executes emboss processing for embossing the IC card 5.

The IC reader/writer 44 executes IC writing processing for storing various types of data in an IC chip 100 (see FIG. 2) of the IC card 5.

Note that in this embodiment, it is assumed that issuance of the IC card 5 includes IC writing processing, magnetic processing and emboss processing as described above.

The NW communication unit 45 is connected to the network NW1, and performs communication with, for example, the storage apparatus 3 via the network NW1.

The CPU 46 executes programs stored in the RAM 47 or the nonvolatile memory 48 to perform various types of processing of the issuance apparatus 4.

The RAM 47 is a volatile memory such as a DRAM, and temporarily stores data used when the various types of processing of the issuance apparatus 4 are performed. The RAM 47 also temporarily stores a program that is executed by the CPU 46.

The nonvolatile memory 48 is an HDD, an SSD or the like, and stores various programs and various types of data.

Next, the functional configuration of the IC card issuance system 1 according to this embodiment will be described with reference to FIG. 2.

Figure 2:
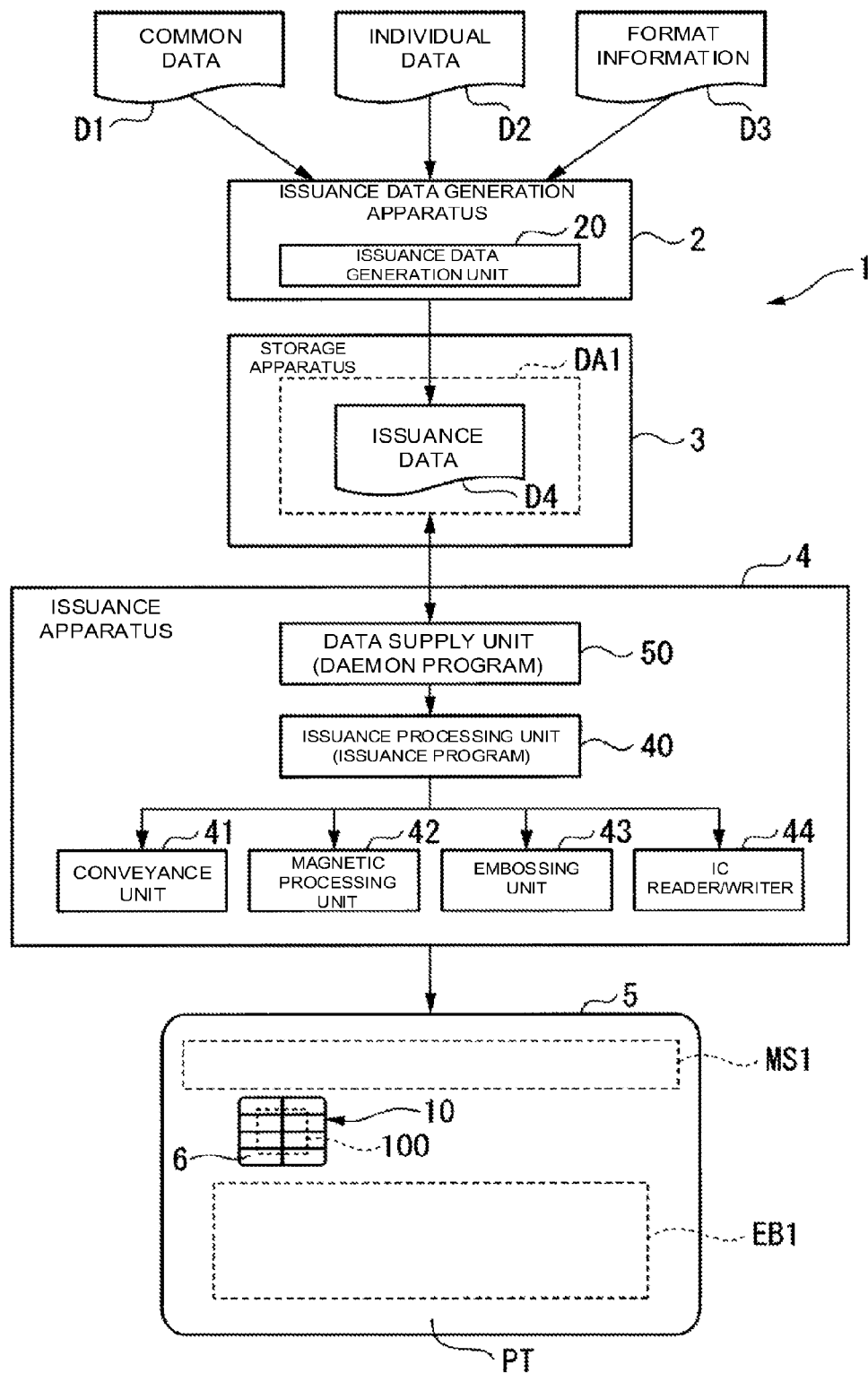
FIG. 2 is a block diagram showing an example of a functional configuration of the IC card issuance system of the first embodiment.

FIG. 2 is a block diagram showing an example of a functional configuration of the IC card issuance system 1 of this embodiment.

As shown in FIG. 2, the issuance data generation apparatus 2 generates issuance data D4 based on common data D1, individual data D2 and format information D3. The issuance data generation apparatus 2 is provided with an issuance data generation unit 20.

The issuance data generation unit 20 is realized by using hardware (e.g., the CPU 24, the RAM 25 and the nonvolatile memory 26) of the issuance data generation apparatus 2 shown in FIG. 1. The issuance data generation unit 20 is realized by the CPU 24 executing an issuance data generation application program (hereinafter, referred to as issuance data generation application), for example. The issuance data generation unit 20 generates the issuance data D4 by integrating the individual data D2 acquired via the input unit 21 or the like, and the common data D1 and the format information D3 that are stored in the nonvolatile memory 26 in advance, for example. The issuance data generation unit 20 stores the generated issuance data D4 in the entry area DA1 of the storage apparatus 3 via the NW communication unit 23. For example, the issuance data generation unit 20 may generate issuance data for a plurality of people (for a plurality of cards), generate a file containing the issuance data for the plurality of people (for the plurality of cards), and store the file in the entry area DA1 of the storage apparatus 3.

Here, the common data D1 is information to make the IC card 5 operable as an IC card, and is data according to the specification of the IC card 5 to be issued. For example, the common data D1 may be an application used when operating the IC card 5, security data, information regarding the issuer (operator) of the IC card 5 or the like. Also, the common data D1 may include data for initializing the IC card 5.

The individual data D2 is data that is specific to the card to be issued (card holder data). For example, when an existing magnetic card is changed to the IC card 5, the individual data D2 may be information (magnetic card data) that is stored in an existing magnetic card. The individual data D2 may be, for example, personal information, information on the owner of the IC card 5 such as a PIN code specific to the card, or the like. The individual data D2 is information that is configured in a file format or a data format (hereinafter, referred to collectively as "data form") unique for each card operating organization or operation purpose.

The format information D3 is information for use in determining the data form of the individual data D2 to be input.

As shown in FIG. 2, the storage apparatus 3 has the entry area DA1, and the issuance data D4 is stored in the entry area DA1 by the issuance data generation apparatus 2.

Figure 3:
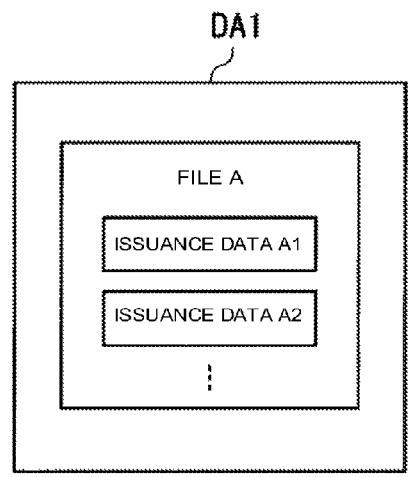
FIG. 3 is a diagram showing an example of issuance data stored in an entry area of the first embodiment.

As shown in FIG. 3, issuance data is stored as data in a file format in the entry area DA1, for example.

FIG. 3 is a diagram showing an example of the issuance data stored in the entry area DA1 of this embodiment.

In the example shown in FIG. 3, a file A, which is a data file, is stored in the entry area DAL This file A contains a plurality of sets of issuance data D4, for example, "issuance data A1", "issuance data A2" . . . .

Returning to the description with reference to FIG. 2, the issuance apparatus 4 is provided with a data supply unit 50, an issuance processing unit 40, the card conveyance unit 41, the magnetic processing unit 42, the embossing unit 43 and the IC reader/writer 44.

The data supply unit 50 (daemon program) is realized by using hardware (ex., the CPU 46, the RAM 47, and the nonvolatile memory 48) of the issuance apparatus 4 shown in FIG. 1. The data supply unit 50 is realized by the CPU 46 (computer) executing the daemon program, for example. Assume that the daemon program for realizing the data supply unit 50 resides and operates on the OS in the issuance apparatus 4.

The data supply unit 50 monitors the entry area DA1 (storage area) designated in advance, and if the issuance data D4 is stored in the entry area DA1, reads out the issuance data D4 stored in the entry area DA1, and supplies the read issuance data D4 to the issuance processing unit 40 such that the issuance processing unit 40 issues the IC card 5 based on the issuance data D4.

Specifically, the data supply unit 50 monitors the entry area DA1 by polling, for example, and determines whether or not a file containing the issuance data D4 (for example, the file A) has been stored in the entry area DAL Specifically, the data supply unit 50 monitors whether or not a file containing the issuance data D4 (for example, the file A) has been stored in the entry area DA1 by periodically polling the storage apparatus 3, for example. Concretely, the data supply unit 50 acquires a file list that is present in the entry area DA1 using a command of the file system for managing the storage apparatus 3, for example, and monitors whether or not a file containing the issuance data D4 (for example, the file A) has been stored in the entry area DAL If a file containing the issuance data D4 has been stored in the entry area DA1, the data supply unit 50 reads out the file stored in the entry area DA1, and supplies the read file to the issuance processing unit 40 that issues the IC card 5, such that the issuance processing unit 40 executes issuance of the IC card 5 based on the issuance data D4 contained in the file. Moreover, after supplying the issuance data D4 stored in the entry area DA1 to the issuance processing unit 40, the data supply unit 50 deletes the issuance data D4 from the entry area DAL In other words, the data supply unit 50 deletes the file containing the issuance data D4 (for example, the file A) from the entry area DAL Note that the data supply unit 50 may supply the file containing the issuance data D4 to the issuance processing unit 40, or supply the issuance data D4 contained in the file to the issuance processing unit 40.

The issuance processing unit 40 is realized by using hardware (ex., the CPU 46, the RAM 47 or the nonvolatile memory 48) of the issuance apparatus 4 shown in FIG. 1. For example, the data supply unit 50 is realized by the CPU 46 (computer) executing an issuance program. Here, the issuance program is a program for controlling the card conveyance unit 41, the magnetic processing unit 42, the embossing unit 43 and the IC reader/writer 44 so as to execute processing for issuing the IC card 5 based on the issuance data D4.

The issuance processing unit 40 issues the IC card 5 based on the issuance data D4 supplied by the data supply unit 50. For example, the issuance processing unit 40 controls the card conveyance unit 41 so as to take out the IC card 5 from the rack for unissued cards, and to convey the IC card 5 to the respective constituent elements, namely, the magnetic processing unit 42, the embossing unit 43 and the IC reader/writer 44. The issuance processing unit 40 controls the magnetic processing unit 42 so as to store magnetic card data that is based on the issuance data D4 in the magnetic stripe MS1 of the IC card 5. The issuance processing unit 40 also controls the embossing unit 43 so as to execute embossing on an emboss area EB1 of a card substrate PT of the IC card 5. The issuance processing unit 40 controls the IC reader/writer 44 so as to store data that is based on the issuance data D4 in the IC chip 100 of the IC card 5. The issuance processing unit 40 then controls the card conveyance unit 41 so as to store, in the rack for issued cards, the IC card 5 that has been issued. Note that the issuance processing unit 40 starts execution of such issuance processing using, as a trigger, the data supply unit 50 supplying the issuance data D4.

Here, an example of the configuration of the IC card 5 issued by the issuance processing unit 40 will be described. As shown in FIG. 2, the IC card 5 is provided with an IC module 10. The IC module 10 is provided with a contact portion 6 and the IC chip 100. For example, the IC card 5 is formed by implementing the IC module 10 on the card substrate PT (an example of a card body) made of plastic. In other words, the IC card 5 is provided with the IC module 10 and the card substrate PT in which the IC module 10 is embedded. The IC card 5 also includes the magnetic stripe MS1 capable of storing magnetic card data on the front surface or the back surface of the card substrate PT on which the contact portion 6 is provided. Also, the card substrate PT includes the emboss area EB1 that is an area to be embossed.

Moreover, the IC card 5 can communicate with the IC reader/writer 44 via the contact portion 6. For example, the IC card 5 receives a command (processing request) transmitted by the IC reader/writer 44 via the contact portion 6, and executes processing (command processing) that is based on the received command. The IC card 5 then transmits a response (processing response), which is an execution result of the command processing, to the IC reader/writer 44 via the contact portion 6. The IC card 5 executes issuance processing by executing such command processing.

Next, the operations of the IC card issuance system 1 of this embodiment will be described.

First, as shown in FIG. 2, the issuance data generation apparatus 2 generates the issuance data D4 based on the common data D1, the individual data D2 and the format information D3. Specifically, the issuance data generation unit 20 of the issuance data generation apparatus 2 generates the issuance data D4 based on the common data D1, the individual data D2 and the format information D3. For example, the issuance data generation unit 20 stores a data file containing the generated issuance data D4 in the entry area DA1 of the storage apparatus 3 via the NW communication unit 23.

Next, the data supply unit 50 of the issuance apparatus 4 monitors the entry area DA1 of the storage apparatus 3 via the NW communication unit 45, and if the data file containing the issuance data D4 is stored in the entry area DA1, reads out the data file. The data supply unit 50 then supplies the data file read from the entry area DA1 to the issuance processing unit 40 to start issuance processing. Also, the data supply unit 50 deletes the read data file from the entry area DA1 of the storage apparatus 3 via the NW communication unit 45.

The issuance processing unit 40 executes processing for issuing the IC card 5 based on the issuance data D4 contained in the data file supplied from the data supply unit 50.

In this manner, in the IC card issuance system 1 according to this embodiment, processing from generation of the issuance data D4 to issuance of the IC card 5 is executed in a one-stop manner.

Next, processing of the data supply unit 50 of this embodiment will be described in detail with reference to FIG. 4.

Figure 4:
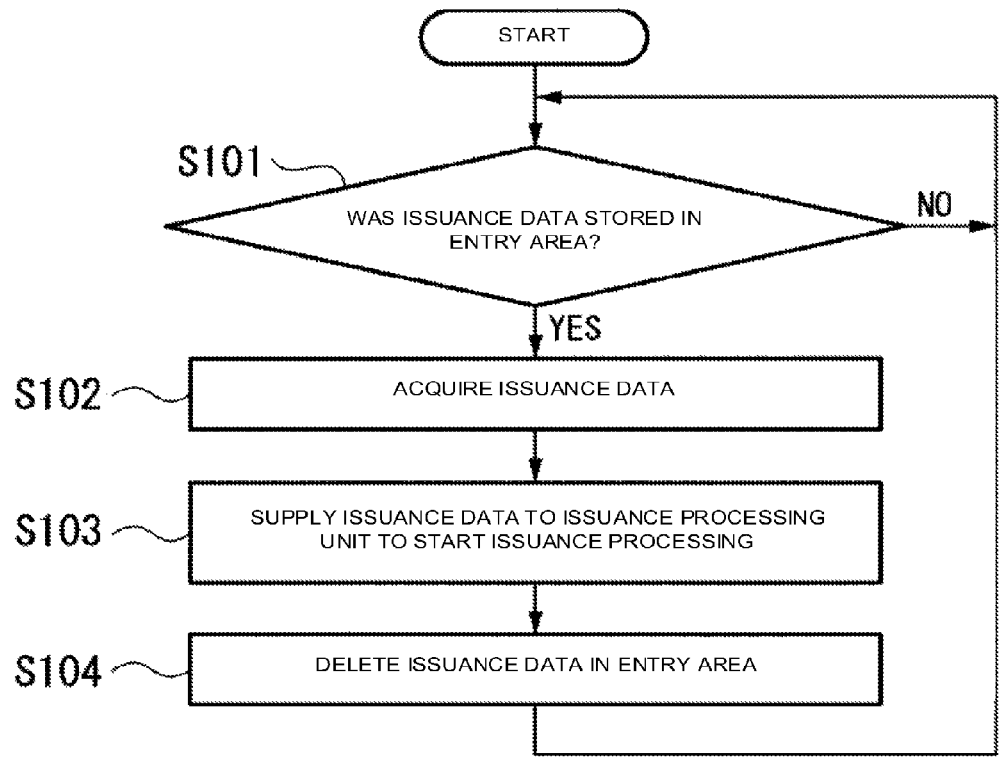
FIG. 4 is a flowchart showing an example of processing of a data supply unit of the first embodiment.

FIG. 4 is a flowchart showing an example of the processing of the data supply unit 50 of this embodiment.

As shown in FIG. 4, the data supply unit 50 first determines whether or not the issuance data D4 is stored in the entry area DA1 (step S101). Specifically, the data supply unit 50 monitors the entry area DA1 of the storage apparatus 3 via the NW communication unit 45, and determines whether or not the issuance data D4 has been stored in the entry area DA1, depending on whether or not a data file such as the file A shown in FIG. 3 has been newly stored. If the issuance data D4 (data file) has been stored in the entry area DA1 (step S101: YES), the data supply unit 50 advances the procedure to step S102. If the issuance data D4 (data file) has not been stored in the entry area DA1 (step S101: NO), the data supply unit 50 returns the procedure to step S101.

In step S102, the data supply unit 50 acquires the issuance data D4. Specifically, the data supply unit 50 reads the data file from the entry area DA1 of the storage apparatus 3 via the NW communication unit 45, and acquires the issuance data D4.

Next, the data supply unit 50 supplies the issuance data D4 to the issuance processing unit 40 to start issuance processing (step S103). Specifically, the data supply unit 50 supplies the issuance data D4 to the issuance processing unit 40, for example, by supplying, to the issuance processing unit 40, the data file read from the entry area DA1. The issuance processing unit 40 automatically starts issuance processing by the data file (the issuance data D4) being supplied from the data supply unit 50.

Next, the data supply unit 50 deletes the issuance data D4 in the entry area DA1 (step S104). Specifically, the data supply unit 50 deletes, from the entry area DA1 of the storage apparatus 3 via the NW communication unit 45, the data file that has been read. After the processing in step S104, the data supply unit 50 returns the procedure to step S101.

Note that in the above-described flowchart shown in FIG. 4, step S101 corresponds to a determination step, and steps S102 and S103 correspond to a data supply step. Also, step S104 corresponds to a delete step.

As described above, the issuance apparatus 4 (IC card issuance apparatus) according to this embodiment is provided with the issuance processing unit 40 and the data supply unit 50. The issuance processing unit 40 issues the IC card 5 based on the issuance data D4. The data supply unit 50 monitors whether or not the file of the issuance data D4 has been stored in the storage apparatus 3 (the entry area DA1) designated in advance, and if the file of the issuance data D4 is stored in the storage apparatus 3 (the entry area DA1), supplies, to the issuance processing unit 40, the issuance data D4 contained in the issuance data D4 file stored in the storage apparatus 3 (the entry area DA1), and causes the issuance processing unit 40 to executes issuance of the IC card 5 that is based on the issuance data D4.

This enables the issuance apparatus 4 according to this embodiment to execute (automatize) processing from generation of the issuance data D4 to issuance of the IC card 5 in a one-stop manner, and thus the workload required for issuance processing can be reduced. Specifically, in the issuance apparatus 4 according to this embodiment, the processing for issuing the IC card 5 is started by the issuance data D4 file being stored in the storage apparatus 3 (the entry area DA1), and thus, for example, a large amount of issuance data does not need to be manually moved to the issuance apparatus 4. This enables the issuance apparatus 4 according to this embodiment to reduce the man-hours for moving a large amount of issuance data to the issuance apparatus 4. Therefore, the issuance apparatus 4 according to this embodiment can reduce the workload required for the issuance processing, and improve the convenience.

Moreover, the issuance apparatus 4 according to this embodiment supplies issuance data to the issuance apparatus 4 without requiring a manual operation, and thus, for example, a possibility that confidential data such as personal information leaks can be reduced. Accordingly, the issuance apparatus 4 according to this embodiment can reduce the workload required for the issuance processing while ensuring security.

Moreover, in this embodiment, after supplying, to the issuance processing unit 40, the issuance data D4 contained in the issuance data D4 file stored in the storage apparatus 3 (the entry area DA1), the data supply unit 50 deletes, from the storage apparatus 3 (the entry area DA1), the file containing the issuance data D4 supplied to the issuance processing unit 40.

Accordingly, the issuance apparatus 4 according to this embodiment does not leave the issuance data D4, and thus, for example, it is possible to further reduce the possibility that confidential data such as personal information leaks.

The IC card issuance system 1 according to this embodiment is provided with the issuance data generation apparatus 2 and the above-described issuance apparatus 4. The issuance data generation apparatus 2 generates the issuance data D4 for issuing the IC card 5 based on supplied data (e.g., individual data D2), and stores the file of the generated issuance data D4 in the storage apparatus 3 (the entry area DA1) designated in advance.

This enables the IC card issuance system 1 according to this embodiment to execute processing from generation of the issuance data D4 to issuance of the IC card 5 in a one-stop manner similarly to the above-described issuance apparatus 4, and thus the workload required for the issuance processing can be reduced.

Note that the IC card issuance system 1 according to this embodiment can successively transfer the issuance data D4 generated by the issuance data generation apparatus 2 to the entry area DA1, and thus has an effect that large volume data does not need to be transferred in a large amount at a time.

Second Embodiment

Next, an IC card issuance system 1a of a second embodiment will be described with reference to the drawings.

Figure 5:
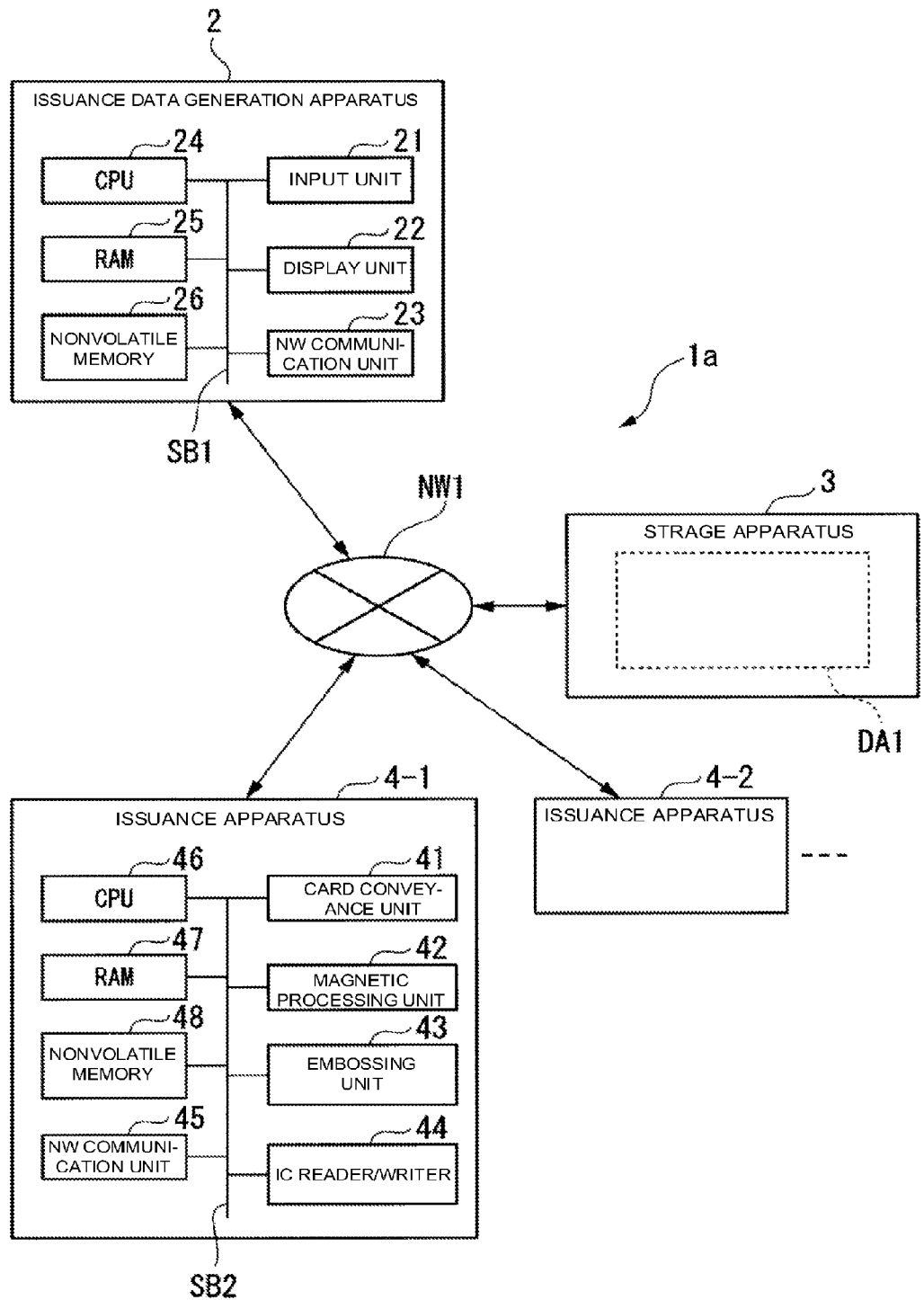
FIG. 5 is a diagram showing an example of a hardware configuration of an IC card issuance system of a second embodiment.

FIG. 5 is a diagram showing an example of a hardware configuration of the IC card issuance system 1a of this embodiment.

As shown in FIG. 5, the IC card issuance system 1a is provided with the issuance data generation apparatus 2, the storage apparatus 3 and a plurality of issuance apparatuses (4-1, 4-2 . . . ). Note that the issuance data generation apparatus 2, the storage apparatus 3 and the plurality of issuance apparatuses (4-1, 4-2 . . . ) are connected to each other via the network NW1.

Note that in FIG. 5, the same signs are given to the same constituent elements as the constituent elements shown in FIG. 1, and description thereof is omitted.

The issuance apparatuses (4-1, 4-2 . . . ) have the same hardware configuration as that of the issuance apparatus 4 shown in FIG. 1, and if in the following description, any issuance apparatus provided in the IC card issuance system 1a is referred to, or the issuance apparatus is not distinguished in particular, the issuance apparatus will be described as "issuance apparatus 4".

Note that the IC card issuance system 16a according to this embodiment is different from the first embodiment in that the IC card issuance system 1a is provided with the plurality of issuance apparatuses 4. In addition, because there are the plurality of issuance apparatuses 4, the IC card issuance system 1a according to this embodiment is different from the first embodiment in the processing (functional configuration) of the issuance apparatus 4.

Next, the functional configuration of the IC card issuance system 1a according to this embodiment will be described with reference to FIG. 6.

Figure 6:
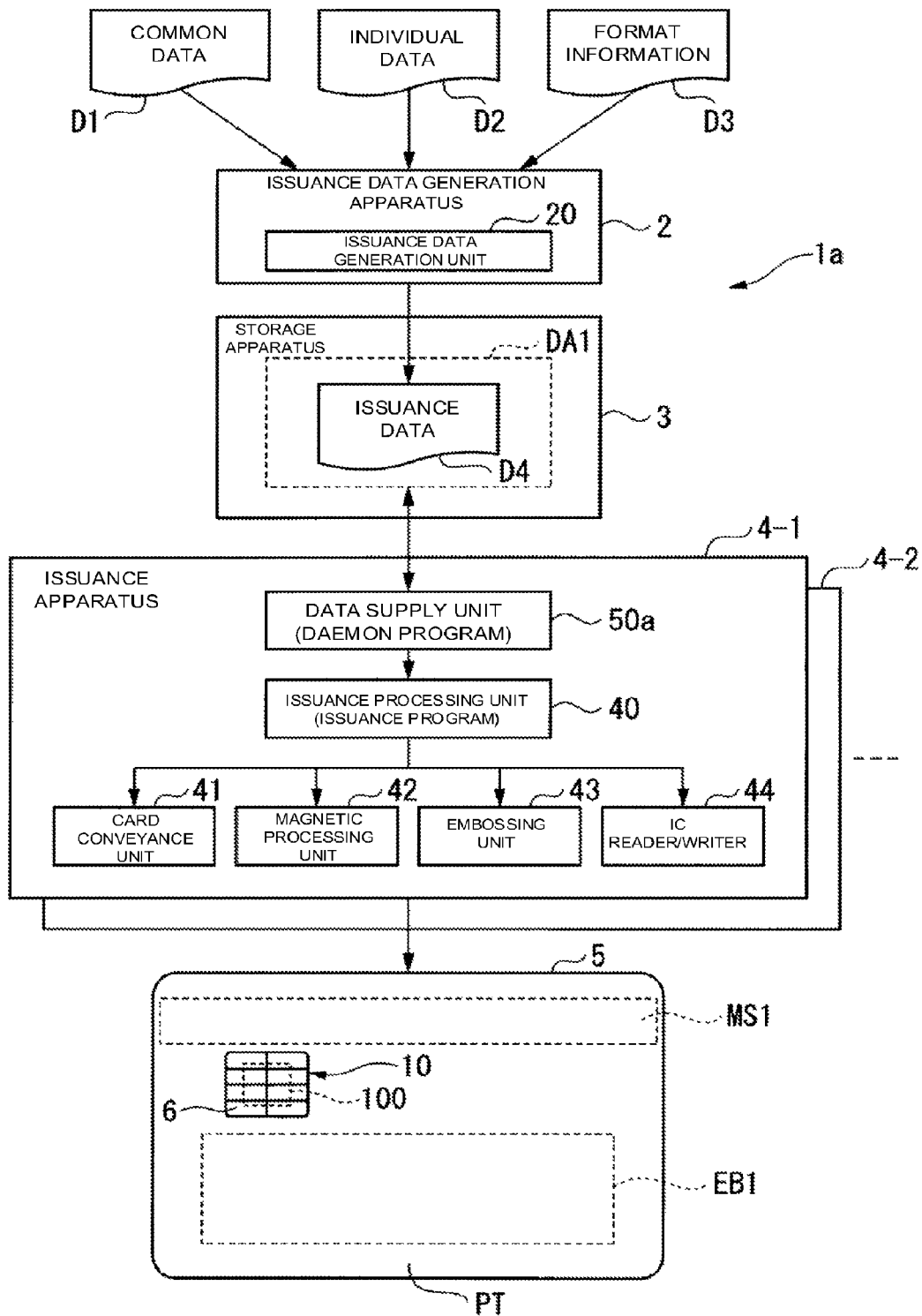
FIG. 6 is a block diagram showing an example of a functional configuration of the IC card issuance system of the second embodiment.

FIG. 6 is a block diagram showing an example of a functional configuration of the IC card issuance system 1a of this embodiment.

Note that in FIG. 6, the same signs are given to the same constituent elements as the constituent elements shown in FIG. 2, and description thereof is omitted.

In this embodiment, in order for one of the plurality of issuance apparatuses (4-1, 4-2, . . . ) to execute issuance processing, the issuance data generation unit 20 gives a file name designating the issuance apparatus 4 to a data file containing the generated issuance data D4, and stores the data file in the entry area DAL Here, the file name designating the issuance apparatus 4 is a file name containing identification information designating the issuance apparatus 4, for example.

Figure 7:
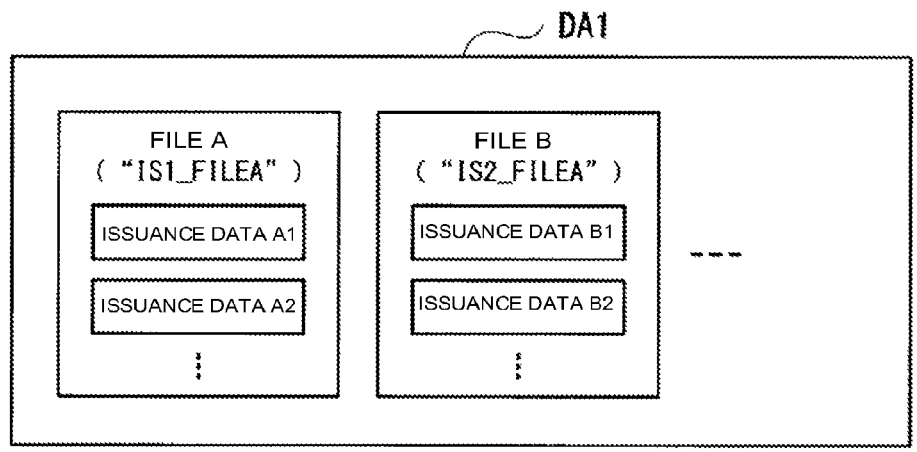
FIG. 7 is a diagram showing an example of issuance data stored in an entry area of the second embodiment.

FIG. 7 is a diagram showing an example of issuance data stored in the entry area DA1 of this embodiment.

As shown in FIG. 7, a plurality of data files are stored in the entry area DAL In the example shown in FIG. 7, the file A contains "issuance data A1", "issuance data A2" . . . . Also, "IS1_FILEA" is a file name that is given to the file A. Here, "IS1" is identification information designating the issuance apparatus 4-1.

A file B contains "issuance data B1", "issuance data B2" . . . . Also, "IS2 FILEA" is a file name that is given to the file B. Here, "IS2" is identification information designating the issuance apparatus 4-2.

In this manner, identification information corresponding to the issuance apparatuses 4 is added to the issuance data D4 by the issuance data generation unit 20, and the issuance data D4 is stored in the entry area DA1.

Returning to the description with reference to FIG. 6, each of the issuance apparatuses (4-1, 4-2 . . . ) is provided with a data supply unit 50a, an issuance processing unit 40, a card conveyance unit 41, a magnetic processing unit 42, an embossing unit 43 and an IC reader/writer 44.

The basic functions of the data supply unit 50a are similar to those of the above-described data supply unit 50 of the first embodiment, and are realized by the CPU 46 executing a daemon program, for example. For example, the data supply unit 50a supplies, to the issuance processing unit 40, the issuance data D4 to which identification information corresponding to the issuance apparatus to which the data supply unit 50a belongs is added, if the issuance data D4 to which identification information corresponding to the issuance apparatus to which the data supply unit 50a belongs is added is stored in the entry area DA1.

Specifically, the data supply unit 50a determines whether or not a data file whose file name contains identification information designating the issuance apparatus to which the data supply unit 50a belongs (for example, "IS1") is stored in the entry area DA1. If a data file whose file name contains identification information designating the issuance apparatus (for example, "IS1") is stored in the entry area DA1, the data supply unit 50a supplies the data file to the issuance processing unit 40 such that the issuance processing unit 40 execute issuance of the IC card 5 that is based on the issuance data D4 contained in the data file.

For example, the data supply unit 50a of the issuance apparatus 4-1 monitors the entry area DA1 shown in FIG. 7, and if a file A wo which a the file name "IS1_FILEA" is stored, reads out the file A, and supplies the file A to the issuance processing unit 40 of the issuance apparatus 4-1.

The data supply unit 50a of the issuance apparatus 4-2 also monitors the entry area DA1 shown in FIG. 7, and if the file B to which a file name "IS2_FILEA" is given is stored, reads out the file B, and supplies the file B to the issuance processing unit 40 of the issuance apparatus 4-2.

Note that the processing of the issuance processing unit 40 is similar to the first embodiment, and description thereof is omitted here.

Next, the processing of the data supply unit 50a of this embodiment will be described in detail with reference to FIG. 8.

Figure 8:
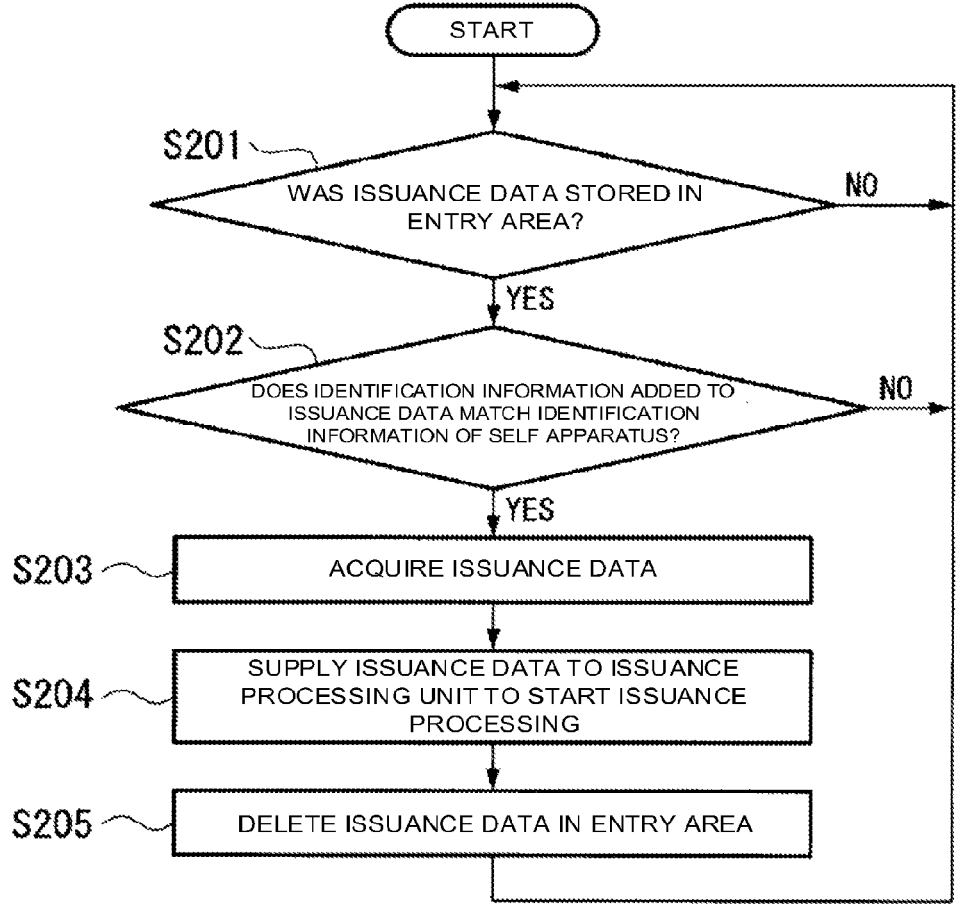
FIG. 8 is a flowchart showing an example of processing of a data supply unit of the second embodiment.

FIG. 8 is a flowchart showing an example of processing of the data supply unit 50a of this embodiment.

As shown in FIG. 8, the data supply unit 50a first determines whether or not the issuance data D4 has been stored in the entry area DA1 (step S201). Specifically, the data supply unit 50a monitors the entry area DA1 of the storage apparatus 3 via the NW communication unit 45, and determines whether or not the issuance data D4 has been stored in the entry area DA1, depending on whether or not a data file such as the file A shown in FIG. 7 has been newly stored, for example. If the issuance data D4 (data file) has been stored in the entry area DA1 (step S201: YES), the data supply unit 50a advances the procedure to step S202. If the issuance data D4 (data file) has not been stored in the entry area DA1 (step S201: NO), the data supply unit 50a returns the procedure to step S201.

In step S202, the data supply unit 50a determines whether or not the identification information that is added to the issuance data D4 matches the identification information of the issuance apparatus to which the data supply unit 50a belongs. In other words, the data supply unit 50a determines whether or not the identification information (for example, "IS1") given to the file name matches the identification information of the issuance apparatus to which the data supply unit 50a belongs. The data supply unit 50a advances the procedure to step S203 if the identification information added to the issuance data D4 matches the identification information of the issuance apparatus to which the data supply unit 50a belongs (step S202: YES). The data supply unit 50a returns the procedure to step S201 if the identification information given to the issuance data D4 does not match the identification information of the issuance apparatus to which the data supply unit 50a belongs (step S202: NO).

The subsequent processing of steps S203 to S205 is similar to the processing of steps S102 to S104 shown in FIG. 4, and thus its further description is omitted here.

As described above, the data supply unit 50a of this embodiment acquires the issuance data D4 generated for the issuance apparatus to which the data supply unit 50a belongs from the entry area DA1, and supplies the issuance data D4 to the issuance processing unit 40.

Note that in the above-described flowchart shown in FIG. 8, steps S201 and S202 correspond to a determination step, and steps S203 and S204 correspond to a data supply step. Also, step S205 corresponds to a delete step.

As described above, in this embodiment, the file of the issuance data D4 is given identification information (for example, file name "IS1") corresponding to the issuance apparatus 4 (4-1, 4-2 . . . ), and is stored in the storage apparatus 3 (the entry area DA1). The data supply unit 50a supplies, to the issuance processing unit 40, the issuance data D4 contained in the issuance data D4 file to which the identification information corresponding to the issuance apparatus to which the data supply unit 50a belongs is added if the issuance data D4 file to which the identification information corresponding to the issuance apparatus to which the data supply unit 50a belongs is added is stored in the storage apparatus 3 (the entry area DA1).

This enables the issuance apparatuses 4 (4-1, 4-2 . . . ) according to this embodiment to appropriately acquire the issuance data D4 generated for them, and appropriately issue the IC card 5 based on the issuance data D4 generated for them.

The IC card issuance system 1a according to this embodiment is provided with the plurality of issuance apparatuses 4 (4-1, 4-2 . . . ). Also, the file of the issuance data D4 is given identification information corresponding to the issuance apparatuses 4 (4-1, 4-2 . . . ), and is stored in the storage apparatus 3 (the entry area DA1). The data supply unit 50a provided in each of the plurality of issuance apparatuses 4 (4-1, 4-2 . . . ) supplies, to the issuance processing unit 40, the issuance data D4 contained in the file of the issuance data D4 to which the identification information corresponding to the issuance apparatus to which the data supply unit 50a belongs is added if the file of the issuance data D4 to which the identification information corresponding to the issuance apparatus to which the data supply unit 50a belongs is added is stored in the storage apparatus 3 (the entry area DA1).

This enables the IC card issuance system 1a according to this embodiment to appropriately perform issuance of the IC card 5 by distributing the processing to the plurality of issuance apparatuses 4.

Moreover, the IC card issuance system 1a according to this embodiment can execute processing from generation of the issuance data D4 to issuance of the IC card 5 in a one-stop manner similarly to the above-described first embodiment, and thus the workload required for the issuance processing can be reduced.

In the above-described embodiments, an example was described in which the data supply unit 50 (50a) deletes the issuance data D4 stored in the entry area DA1, but the issuance data D4 may remain in the entry area DA1 without any change. In this case, the data supply unit 50 (50a) may store, for example, in the nonvolatile memory 48, an identifier (for example, a file name) for identifying the issuance data D4 for which issuance processing has been completed, and determine whether or not the issuance data D4 is the issuance data D4 for which issuance processing has been complete. Alternatively, the data supply unit 50 (50a) may acquire, from the issuance processing unit 40, information identifying the issuance data D4 for which issuance processing has been completed, and determine, based on the information, whether or not the issuance data D4 is the issuance data D4 for which issuance processing has been completed.

Moreover, in the above-described embodiments, an example was described in which the issuance data D4 is turned into a data file, and is stored in the entry area DA1, but the present invention is not limited thereto, and the issuance data D4 may be stored as data in a predetermined file.

Also, in the above-described embodiments, an example was described in which the entry area DA1 is one data storage area of one storage apparatus 3, but the present invention is not limited thereto. For example, a configuration may be adopted in which the IC card issuance system 1 (1a) is provided with a plurality of storage apparatuses 3, and the entry area DA1 refers to a plurality of data storage areas of one or more storage apparatuses 3, or one data storage area straddling a plurality of storage apparatuses 3.

Also, in the above-described embodiments, an example was described in which in issuance processing, the IC card issuance system 1 (1a) executes processing for storing data in the IC chip 100 and the magnetic stripe MS1 and processing for performing embossing, but the present invention is not limited thereto. For example, the IC card issuance system 1 (1a) does not have to execute one of or both the processing for storing data in the magnetic stripe MS1 and the processing for performing embossing.

Also, an example was described in which the IC card issuance system 1 (1a) issues the contact type IC card 5 provided with the contact portion 6, but the IC card issuance system 1 (1a) may be applied to a contactless-type IC card that performs communication via a contactless interface that uses a coil or the like.

Moreover, in the above-described embodiments, an example was described in which the IC card issuance system 1 (1a) is provided with one issuance data generation apparatus 2, but the IC card issuance system 1 (1a) may be provided with a plurality of issuance data generation apparatuses 2.

Also, in the above-described second embodiment, an example was described in which a file name of the issuance data D4 is used as identification information for switching the issuance apparatus 4 that performs processing for issuing the IC card 5, but other identification information may be added to the issuance data D4. For example, the issuance data D4 and identification information designating the issuance apparatus 4 may be associated with each other, and stored as data in a file.

Also, in the above-described second embodiment, instead of adding identification information to a file name of the issuance data D4, a plurality of entry areas DA1 may be provided such that one issuance apparatus 4 is designated for each of the entry areas DA1.

According to at least one embodiment described above, the workload required for the issuance processing can be reduced by the IC card issuance system 1 (1a) including the issuance processing unit 40 that issues the IC card 5 based on the issuance data D4, and the data supply unit 50 that monitors whether or not the file of the issuance data D4 has been stored in the storage apparatus 3 designated in advance, and if the file of the issuance data D4 has been stored in the storage apparatus 3, supplies, to the issuance processing unit 40, the issuance data D4 contained in the issuance data D4 file stored in the storage apparatus 3, such that the issuance processing unit 40 executes issuance of the IC card 5 based on the issuance data D4.

The above-described embodiments can be expressed as follows.

An IC card issuance apparatus including:

an issuance processing unit that executes issuance processing for storing data in an IC card based on issuance data generated based on common data for operating the IC card and individual data to be individually stored in the IC card; and a data supply unit that monitors whether or not a file of the issuance data has been stored, by polling a storage apparatus designated in advance, and if the file of the issuance data has been stored in the storage apparatus, supplies, to the issuance processing unit, the issuance data contained in the issuance data file stored in the storage apparatus.

Note that each constituent element provided in the above-described IC card issuance system 1 (1a) has a computer system therein. A configuration may be adopted in which a program for realizing the functions of each of the constituent elements of the above-described IC card issuance system 1 (1a) is recorded in a computer-readable recording medium, and this program recorded in the recording medium is read and executed by the computer system, whereby processing in each of the constituent elements of the above-described IC card issuance system 1 (1a) is performed. Here, the computer system reading and executing a program recorded in the recording medium includes installing the program in the computer system. Assume that the "computer system" here includes hardware such as an OS and a peripheral device.

The "computer system" may also include a plurality of computer apparatuses connected via the Internet, a WAN, a LAN or a network including a communication line such as a dedicated line. The "computer-readable recording medium" refers to a portable medium such as a flexible disk, a magneto-optical disk, a ROM or a CD-ROM, or a storage apparatus such as a hard disk built in the computer system. As described above, the recording medium that stores a program may be a non-temporary recording medium such as a CD-ROM.

The recording medium also includes a recording medium that is provided internally or externally and is accessible from a distribution server in order to distribute a program. Note that a configuration may be adopted in which a program is divided into a plurality of pieces, each of the pieces is downloaded at a different timing, and after that, the pieces are joined in each of the constituent elements of the IC card issuance system 1 (1a), or a different distribution server may distribute each of the divided programs. Furthermore, assume that the "computer-readable recording medium" also includes a recording medium that holds a program for a certain period, such as a volatile memory (RAM) in the computer system that serves as a server or a client when a program is transmitted via the network. Also, the above program may be a program for realizing a portion of the above-described functions. Furthermore, the above program may be a program that can realize the above-described function in combination with a program that has already been recorded in the computer system, that is, a so-called difference file (difference program).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card issuance apparatus comprising:
a processor;
a memory configured to store a program;
an IC reader/writer configured to write data to an IC card;
a card conveyor configured to convey the IC card;
a magnetic processing unit configured to store data in a magnetic stripe of the IC card; and
an embossing unit configured to perform embossing on the IC card;
   wherein the processor, by executing the program, functions as:
      an issuance processing unit configured to perform processing for issuing the IC card based on issuance data; and
      a data supply unit configured to
      monitor periodically whether or not an issuance data file containing the issuance data is stored in a storage apparatus designated in advance, and
      supply the issuance data contained in the issuance data file stored in the storage apparatus to the issuance processing unit if the issuance data file is stored in the storage apparatus;
wherein the IC card is provided with an IC module including an IC chip, and a card substrate in which the IC module is embedded,
wherein the issuance processing unit is configured to control the IC reader/writer to store data that is based on the issuance data in the IC chip of the IC card,
wherein the IC card is provided with the magnetic stripe,
wherein the issuance processing unit is configured to control the magnetic processing unit to store, in the magnetic stripe of the IC card, magnetic card data that is based on the issuance data,
wherein the issuance processing unit is configured to control the embossing unit to execute embossing on the card substrate of the IC card based on the issuance data, and
wherein the issuance processing unit is configured to control the card conveyor to take out the IC card from a rack for an unissued card, convey the IC card that has been taken out, to the magnetic processing unit, the embossing unit and the IC reader/writer, and store the IC card that has been issued in a rack for an issued card.

* * * * *